US010402160B2

(12) United States Patent
Janus

(10) Patent No.: US 10,402,160 B2
(45) Date of Patent: *Sep. 3, 2019

(54) AUDIO LOCALIZATION TECHNIQUES FOR VISUAL EFFECTS

(71) Applicant: Intel Corporation, Santa Clara, CA (US)

(72) Inventor: Scott Janus, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 777 days.

This patent is subject to a terminal disclaimer.

(21) Appl. No.: 14/928,878

(22) Filed: Oct. 30, 2015

(65) Prior Publication Data

US 2016/0162260 A1 Jun. 9, 2016

Related U.S. Application Data

(63) Continuation of application No. 13/830,481, filed on Mar. 14, 2013, now Pat. No. 9,210,526.

(51) Int. Cl.
G06F 3/048 (2013.01)
G06F 3/16 (2006.01)
G09G 3/00 (2006.01)
H04R 1/00 (2006.01)
H04S 7/00 (2006.01)
G06F 3/14 (2006.01)

(52) U.S. Cl.
CPC ............ *G06F 3/167* (2013.01); *G06F 3/048* (2013.01); *G06F 3/1446* (2013.01); *G09G 3/003* (2013.01); *H04R 1/00* (2013.01); *H04S 7/302* (2013.01); *H04S 2400/11* (2013.01)

(58) Field of Classification Search
CPC ... G06F 3/048; G06F 3/14; G06F 3/00; G06F 3/016
See application file for complete search history.

(56) References Cited

U.S. PATENT DOCUMENTS

| 2002/0175933 | A1  | 11/2002 | Ronkainen et al. |             |
|--------------|-----|---------|------------------|-------------|
| 2003/0151562 | A1* | 8/2003  | Kulas            | G06F 3/1446 |
|              |     |         |                  | 345/1.1     |
| 2004/0263424 | A1* | 12/2004 | Okuley           | G06F 3/1446 |
|              |     |         |                  | 345/1.1     |
| 2006/0236255 | A1* | 10/2006 | Lindsay          | G06F 3/0481 |
|              |     |         |                  | 715/766     |
| 2008/0025529 | A1  | 1/2008  | Keohane et al.   |             |

(Continued)

OTHER PUBLICATIONS

Extended European Search Report received for European Patent Application No. 16201068.0, dated Mar. 10, 2017, 9 pages.

*Primary Examiner* — Hugo Molina

(57) ABSTRACT

Techniques for improved audio localization for visual effects. In one embodiment, for example, an apparatus may comprise a processor circuit and an audio management module, and the audio management module may be operable by the processor circuit to determine a position of a user interface element in a presentation area, determine an audio effect corresponding to the user interface element, determine audio location information for the audio effect based on the position of the user interface element, the audio location information defining an apparent position for the audio effect, and generate audio playback information for the audio effect based on the audio location information.

25 Claims, 7 Drawing Sheets

(56) References Cited

U.S. PATENT DOCUMENTS

| | | | |
|---|---|---|---|
| 2008/0072154 A1* | 3/2008 | Michaelis | G06F 3/04812 715/727 |
| 2008/0229206 A1 | 9/2008 | Taylor et al. | |
| 2009/0259942 A1* | 10/2009 | Bitonti | G06F 3/167 715/727 |
| 2010/0053164 A1* | 3/2010 | Imai | G06F 3/011 345/427 |
| 2010/0272270 A1* | 10/2010 | Chaikin | H04R 29/008 381/59 |
| 2011/0010627 A1* | 1/2011 | Donaldson | G06F 3/167 715/727 |
| 2011/0115688 A1 | 5/2011 | Yu | |
| 2013/0315038 A1* | 11/2013 | Ferren | G06K 9/3266 367/197 |

* cited by examiner

AUDIO LOCALIZATION TECHNIQUES FOR VISUAL EFFECTS

CROSS-REFERENCE TO RELATED APPLICATIONS

This application is a continuation of, claims the benefit of and priority to previously filed U.S. patent application Ser. No. 13/830,481 filed Mar. 14, 2013, entitled "AUDIO LOCALIZATION TECHNIQUES FOR VISUAL EFFECTS", the subject matter of which is incorporated herein by reference in its entirety.

TECHNICAL FIELD

Embodiments described herein generally relate to the generation and consumption of audio and visual effects.

BACKGROUND

In systems comprising large displays, large display arrays, or displays separated by significant distances, it may not be possible for a user to maintain all of the collective display area within his field of vision simultaneously. As a result, prompts or other visual elements requiring user attention may be presented in portions of the collective display area lying outside the users field of vision. Additionally, in some conventional configurations, audio effects corresponding to any visual elements presented in the collective display area may be generated such that they appear to originate from the same point, such as the midpoint between two speakers. As a result, in such conventional systems, audio effects corresponding to visual elements may not appear to originate from positions corresponding to the positions of those visual elements.

DETAILED DESCRIPTION

Various embodiments may be generally directed to techniques for audio localization for visual effects. In one embodiment, for example, an apparatus may comprise a processor circuit and an audio management module, and the audio management module may be operable by the processor circuit to determine a position of a user interface element in a presentation area, determine an audio effect corresponding to the user interface element, determine audio location information for the audio effect based on the position of the user interface element, the audio location information defining an apparent position for the audio effect, and generate audio playback information for the audio effect based on the audio location information. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
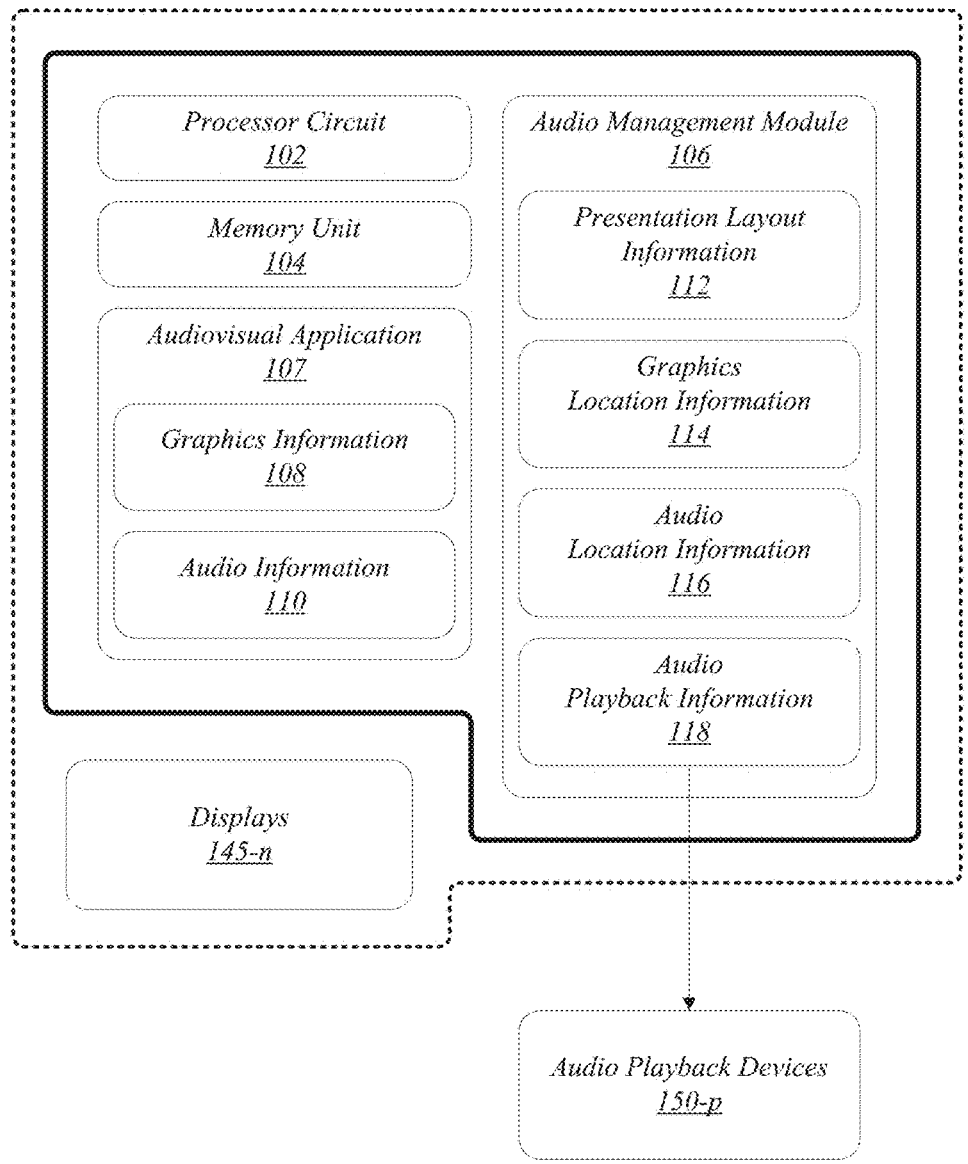
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and an audio management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise audio management module 106. Audio management module 106 may comprise logic, circuitry, and/or instructions operative to generate audio playback information based on audio information. In some embodiments, audio information may comprise information, data, logic, and/or instructions indicating one or more audio effects to be generated. Such audio effects may comprise sounds, tones, speech, music, and/or any other types of audio effects. In various embodiments, audio playback information may comprise information, data, logic, and/or instructions operative on one or more audio playback devices to cause those audio playback devices to generate the one or more audio effects indicated by particular audio information. In some embodiments, processor circuit 102 may be operative to execute an audiovisual application 107. Audiovisual application 107 may comprise any application capable of generating audio information indicating one or more audio effects and/or capable of generating graphics information indicating one or more visual effects to be presented on one or more displays. In various embodiments, audio management module 106 may be operative to generate audio playback information based on audio information received from audiovisual application 107. In an example embodiment, audiovisual application 107 may comprise an operating system and may be operative to generate audio information indicating that a particular sound effect is to be generated. In this example, audio management module 106 may be operative to generate audio playback information based on that audio information. The generated audio playback information, when transmitted to one or more audio playback devices, may be operative on the one or more audio playback devices to generate the desired sound effect. The embodiments are not limited to this example.

FIG. 1 also illustrates a block diagram of a system 140. System 140 may comprise any of the aforementioned elements of apparatus 100. System 140 may further comprise one or more displays 145-$n$. Displays 145-$n$ may comprise any display devices capable of displaying information received from processor circuit 102. Examples of a display 145-$n$ may include a television, a monitor, a projector, and a computer screen. In one embodiment, for example, a display 145-$n$ may be implemented by a liquid crystal display (LCD), light emitting diode (LED) or other type of suitable visual interface. A display 145-$n$ may comprise, for example, a touch-sensitive color display screen. In various implementations, a display 145-$n$ may comprise one or more thin-film transistors (TFT) LCD including embedded transistors. The embodiments, however, are not limited to these examples.

In some embodiments, apparatus 100 and/or system 140 may be configurable to communicatively couple with one or more audio playback devices 150-$p$. Audio playback devices 150-$p$ may comprise any devices capable of generating audio effects based on audio playback information. For example, audio playback devices 150-$p$ may comprise one or more wired and/or wireless speakers. In various embodiments, one or more of audio playback devices 150-$p$ may be comprised within one or more other devices. For example, in one embodiment, audio playback devices 150-$p$ may comprise speakers within a stereo. The embodiments are not limited in this context.

It is worthy of note that although apparatus 100, displays 145-$n$, and audio playback devices 150-$p$ are illustrated as separate components in FIG. 1, the embodiments are not so limited. In some embodiments, one or more audio playback devices 150-$p$ may be comprised within a same device as one or more displays 145-$n$. For example, in some embodiments, one or more audio playback devices 150-$p$ may be comprised within a television that also comprises a display 145-$n$. Likewise, one or more displays 145-$n$ and/or one or more audio playback devices 150-$p$ may be comprised within apparatus 100. For example, in various embodiments, apparatus 100 may be a tablet computer, and may comprise a display 145-$n$ and one or more audio playback devices 150-$p$ comprising speakers. The embodiments are not limited in this context.

In general operation, apparatus 100 and/or system 140 may be operative to generate audio playback information operative on one or more audio playback devices 150-$p$ to cause one or more desired audio effects to be generated. In some embodiments, apparatus 100 and/or system 140 may be operative to generate audio playback information based on audio information that corresponds to particular visual effects. For example, apparatus 100 and/or system 140 may be operative to generate audio playback information for an error chime corresponding to an error window in an operating system. In various such embodiments, apparatus 100 and/or system 140 may be operative to generate audio playback information such that for a user listening to audio playback devices 150-$p$, the apparent origin of a given audio effect corresponds to the position of its associated visual effect on one or more displays 145-$n$. Continuing with the previous example, apparatus 100 and/or system 140 may be operative to generate audio playback information such that if the error window appears in an upper right corner of a display 145-$n$, the apparent origin of the error chime to a listening user is also the upper right corner of the display. An advantage of some embodiments may be that by localizing audio effects according to the locations of their corresponding visual effects may assist a user in locating display items that require attention. Another advantage of various embodiments may be that performing such audio localization may result in a more natural and pleasurable user experience during content consumption, because audio effects may appear to originate from their associated visual sources to a greater extent than they do in conventional systems. Other advantages may be associated with the disclosed subject matter, and the embodiments are not limited in this context.

In some embodiments, audiovisual application 107 may be operative to generate graphics information 108. Graphics information 108 may comprise data, information, logic, and/or instructions corresponding to one or more user interface elements to be displayed on one or more displays 145-$n$. Such user interface elements may comprise any visual or optical sensory effect(s) such as, for example, images, pictures, video, text, graphics, menus, textures, and/or patterns. Such user interface elements may be associated with menus, prompts, and/or controls usable to operate audiovisual application 107, and/or may be associated with content presented by audiovisual application 107. In an example embodiment, audiovisual application 107 may comprise an operating system, and may be operative to generate graphics information 108 corresponding to user interface elements comprising windows, dialogs, alerts, prompts, icons, and/or other visual elements of the operating system. In another example embodiment, audiovisual application 107 may comprise a video playback application such as a DVD movie playback application or a streaming movie playback application, and may be operative to generate graphics information 108 corresponding to user interface elements comprising frames of a movie and/or other visual elements of the movie. In yet another example embodiment, audiovisual application 107 may comprise a gaming application, and may be operative to generate graphics information 108 corresponding to user interface elements associated with content and/or control features of the game. The embodiments are not limited to these examples.

In various embodiments, audiovisual application 107 may be operative to generate audio information 110 corresponding to graphics information 108. Audio information 110 may comprise data, information, logic, and/or instructions corresponding to one or more audio effects to be produced by one or more audio playback devices 150-$p$ in conjunction with the presentation of one or more user interface elements by one or more displays 145-$n$. In an example embodiment in which audiovisual application 107 comprising an operating system, particular audio information 110 may correspond to an alert sound to be produced when a visual prompt of the operating system is displayed. In an example embodiment in which audiovisual application 107 comprises a video playback application, particular audio information 110 may correspond to audio effects associated with a particular frame or portion of a displayed video. In an example embodiment in which audiovisual application 107 comprises a gaming application, particular audio information 110 may correspond to audio effects associated with particular displayed actions or events in a game. The embodiments are not limited to these examples.

Figure 2:
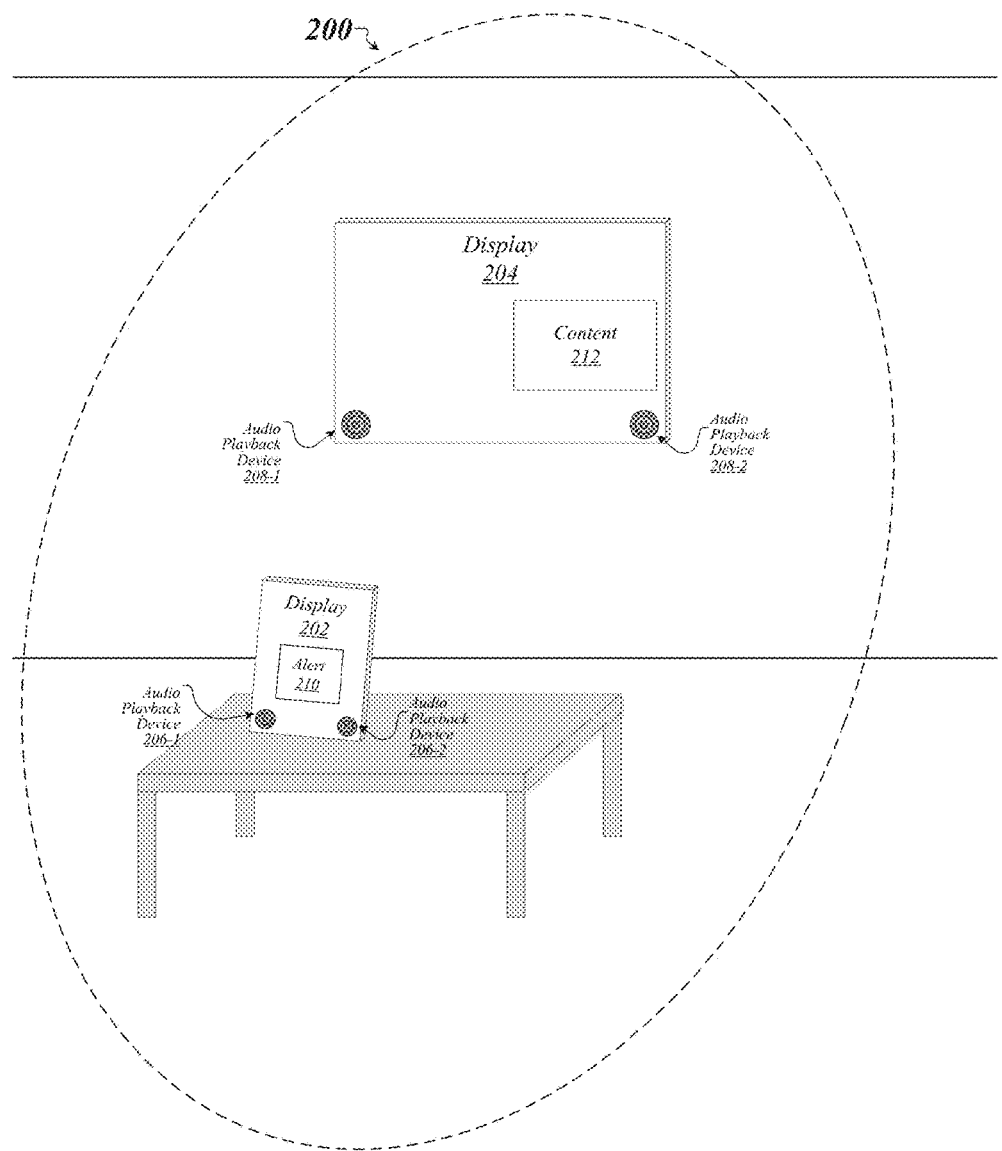
FIG. 2 illustrates one embodiment of a first presentation area.

In some embodiments, audio management module 106 may be operative to determine presentation layout information 112. In various embodiments, presentation layout information 112 may comprise data, information, logic, and/or instructions indicating a number of displays 145-$n$ and/or a number of audio playback devices 150-$p$ in a presentation area, and the locations of those displays 145-$n$ and/or audio playback devices 150-$p$ within the presentation area. As employed herein, the term "presentation area" denotes a region in two-dimensional or three-dimensional space comprising one or more displays 145-$n$ and one or more audio playback devices 150-$p$, and further comprising any points from which visual and/or audio effects presented by those displays 145-$n$ and/or audio playback devices 150-$p$ should appear to originate. FIG. 2 illustrates an example of a presentation area 200. As shown in FIG. 2, presentation area 200 is a three-dimensional space defined by and comprising displays 202 and 204 and audio playback devices 206-1, 206-2, 208-1, and 208-2. Display 202 is situated on a coffee table and comprises a tablet computer, while display 204 is situated on a rear wall and comprises a wall-mounted television. An alert window 210 is presented in the center of display 202, and content 212 is displayed on the right side of display 204. Audio playback devices 206-1 and 206-2 comprise speakers within the tablet computer, and audio playback devices 208-1 and 208-2 comprise speakers within the wall-mounted television. With respect to the example of FIG. 2, in some embodiments, presentation layout information 112 of FIG. 1 may indicate that there are two displays in presentation area 200 and may identify their respective positions therein. Likewise, presentation layout information 112 may indicate that there are four audio playback devices in presentation area 200 and may identify the respective positions of those audio playback devices. The embodiments are not limited to these examples.

In various embodiments, presentation layout information 112 may additionally or alternatively comprise information describing a logical configuration of one or more displays 145-$n$ and/or one or more audio playback devices 150-$p$ in the presentation area. In some such embodiments, presentation layout information 112 may indicate a manner in which multiple displays 145-$n$ and/or multiple audio playback devices 150-$p$ are logically regarded by apparatus 100. For example, presentation layout information 112 may indicate whether a workspace is extended across the multiple displays, and/or whether apparatus 100 has individual control of each of multiple audio playback devices 150-$p$. For example, with respect to FIG. 2, presentation layout information 112 may indicate that apparatus 100 is operative to extend an operating system desktop across displays 202 and 204, and/or that apparatus 100 logically regards and controls audio playback devices 208-1 and 208-2 as a single collective speaker. The embodiments are not limited to these examples.

In various embodiments, audio management module 106 may be operative to determine presentation layout information 112 based on configuration information for one or more displays 145-$n$ and/or one or more audio playback devices 150-$p$. For example, in some embodiments, processor circuit 102 may be operative to execute an operating system in which drivers are registered for one or more displays 145-$n$ and/or one or more audio playback devices 150-$p$. Processor circuit 102 may be operative to provide information identifying those registered devices to audio management module 106, which may utilize that information to count the displays 145-$n$ and/or audio playback devices 150-$p$, and/or to determine their logical configurations. Additionally or alternatively, in various embodiments, audio management module 106 may be operative to determine presentation layout information 112 based on position sensing information describing the locations of one or more displays 145-$n$ and/or one or more audio playback devices 150-$p$. For example, in some embodiments, apparatus 100 may utilize one or more conventional position sensing techniques to sense the positions of one or more displays 145-$n$ and/or one or more audio playback devices 150-$p$. Based on this information, audio management module 106 may be operative to determine presentation layout information 112 identifying the relative locations of one or more displays 145-$n$ and/or one or more audio playback devices 150-$p$ within the presentation area. The embodiments are not limited to these examples.

In various embodiments, audio management module 106 may be operative to determine graphics location information 114 for graphics information 108. Graphics location information 114 may comprise data, information, logic, and/or instructions indicating one or more locations at which one or more user interface elements are to be presented on one or more displays 145-$n$. For example, with respect to the example of FIG. 2, particular graphics location information 114 may indicate that alert window 210 is to be presented in the center of display 202, and/or that content 212 is to be presented on the right side of display 204. The embodiments are not limited in this context.

In some embodiments, audio management module 106 may be operative to determine audio location information 116 based on graphics location information 114 and presentation layout information 112. In various embodiments, audio location information 116 may comprise data, information, logic, and/or instructions identifying positions within the presentation area from which one or more audio effects should seem to originate when heard by a user. In some embodiments, for a given user interface element, audio management module 106 may determine a position within the presentation area based on graphics location information 114 for that user interface element and presentation layout information 112 describing the position of its corresponding display **145-*n* within the presentation area. Audio management module 106 may then be operative to determine audio location information 116 for an audio effect corresponding to the user interface element, indicating a position within the presentation area that matches that of the user interface element. In other words, given the location of a user interface element within the collective displays 145-*n*, audio management module 106 may be operative to determine a position of the user interface element within the two-dimensional space or three-dimensional space of the presentation area. Audio management module 106 may then be operative to identify this determined position in audio location information 116** for an audio effect corresponding to the user interface element. The embodiments are not limited in this context.

In various embodiments, audio management module 106 may be operative to generate audio playback information 118 based on audio information 110 and audio location information 116 for that audio information 110. In some embodiments, audio management module 106 may be operative to generate audio playback information 118 operative on one or more audio playback devices **150-*p* to generate an audio effect such that it appears to originate from a position identified by audio location information 116. In various embodiments, audio management module 106 may be operative to generate audio playback information 118 using one or more techniques for controlling the apparent origins of audio effects. In some embodiments, for example, audio management module 106 may generate audio playback information 118 operative to cause two or more audio playback devices 150-*p* to generate an audio effect with differing volumes. Based on the volume differential(s), the apparent origin of the audio effect may be adjusted. For example, with respect to FIG. 2, an audio effect produced by audio playback devices 208-1 and 208-2 may appear to originate from the right side of display 204 if its playback volume is higher on audio playback device 208-2 than on audio playback device 208-1**. The embodiments are not limited to this example.

In various embodiments, audio management module 106 may additionally or alternatively be operative to generate audio playback information 118 using one or more audio processing techniques to modify audio information 110. For example, in some embodiments, audio management module 106 may be operative utilize one or more spatial audio processing techniques to modify audio information 110 such that its associated audio effects appear to originate from a position identified by audio location information 116. Examples of such spatial audio processing techniques may include head-related transfer function (HRTF) processing, wave field synthesis, reverberation processing, stereo widening, attenuation, phase modification, and phase inversion. The embodiments are not limited to these examples.

It is worthy of note that in various embodiments, it may be desirable that audio management module 106 generate audio playback information 118 operative to produce audio effects that do not appear to originate from a same position as their associated user interface elements. For example, in some embodiments, apparatus 100 may be communicatively coupled to a single display **145-*n*, and displayed user interface elements may be confined to the plane of that display 145-*n*. In such embodiments, audio management module 106 may be operative to generate audio playback information 118 such that audio effects are produced that originate from apparent depths that differ from that of the display 145-*n*. In various embodiments, audio management module 106 may be operative to generate audio playback information 118 such that the apparent depths of audio effects associated with windows, prompts, dialogs, and other visual elements in an operating system depend on the positioning and/or ordering of those visual elements. For example, in some embodiments, audio management module 106 may be operative to generate audio playback information 118 such that audio effects associated with windows that are covered by other visual elements appear to originate from a point behind the display 145-*n*. Additionally or alternatively, audio management module 106 may be operative to generate audio playback information 118** such that such audio effects sound muffled. An advantage of various embodiments may be that by muffling or adding depth to audio effects associated with covered windows, a clue is provided to the user that the window requiring attention is hidden. The embodiments are not limited to this example.

Figure 3:
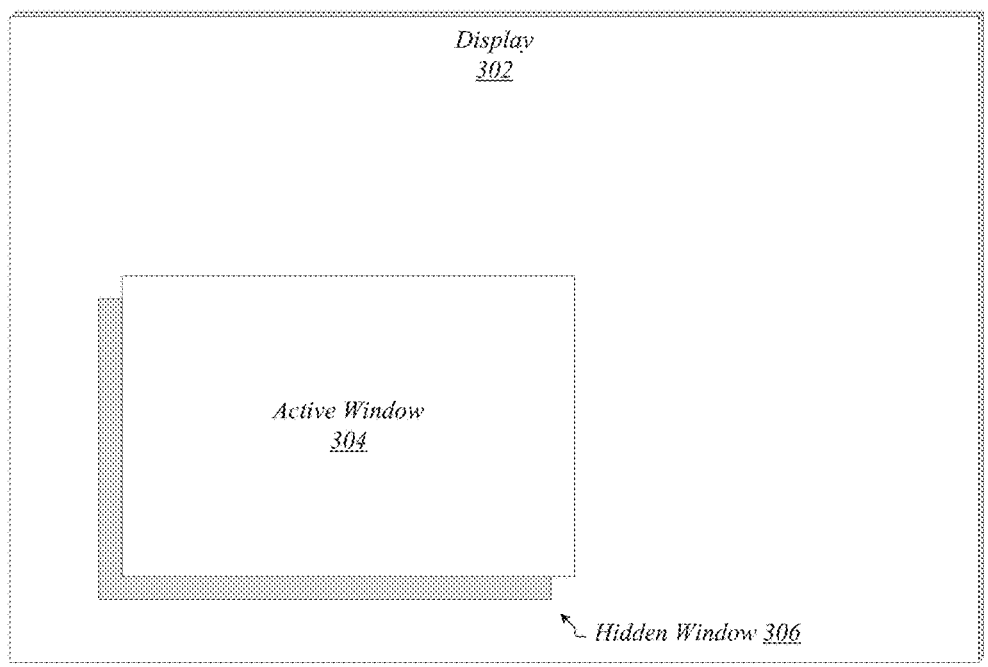
FIG. 3 illustrates one embodiment of a second presentation area.

FIG. 3 illustrates a presentation area 300 that may comprise an example of an embodiment in which depth effects are utilized in conjunction with a single display. As shown in FIG. 3, presentation area 300 comprises a single display 302. Presented on display 302 is an active window 304 that obscures most of a hidden window 306. In some such embodiments, audio management module 106 may be operative to generate audio playback information 118 such that an alert chime associated with hidden window 306 appear to originate from a point behind the bottom left quadrant of display 302. In this manner, those audio effects may indicate to a user not only that the window requiring attention is located in the bottom left quadrant of display 302, but also that it is largely covered by another window. As a result, the user may be able to more easily located the window requiring attention. The embodiments are not limited to this example.

In various embodiments, a given user interface element may extend across multiple displays **145-*n* that are remote from each other. In such embodiments, rather than generating associated audio effects such that they appear to originate from an arbitrarily selected one of the multiple displays 145-*n*, it may be desirable to generate such audio effects such that they appear to originate from a position between those remote displays 145-*n*. For example, with respect to FIG. 2, content 212 may comprise a movie displayed in a movie player window. A user may drag the movie player window to the left, such that it extends into the portion of the desktop presented on display 202. Under such circumstances, audio management module 106 may be operative to generate audio playback information 118 such that audio associated with the movie appears to originate from a point in presentation area 200 that is between display 202 and display 204**. The embodiments are not limited to this example.

It is worthy of note that for audio effects corresponding to any particular user interface element, audio management module 106 may be operative in some embodiments to generate audio playback information 118 that utilizes any or all of audio playback devices **150-*p*, regardless of the locations of those audio playback devices 150-*p* with respect to that user interface element. With respect to FIG. 2, for example, audio management module 106 may be operative to generate audio playback information 118 such that audio effects corresponding to content 212 are generated only by audio playback devices 208-1 and 208-2, only by audio playback devices 206-1 and 206-2, by all four audio playback devices 206-1, 206-2, 208-1, and 208-2, or by any other combination of one or more audio playback devices. It is further worthy of note that in various embodiments, audio management module 106 may be operative to determine multiple positions from which audio effects associated with a particular user interface element should originate, rather than a single position. For example, with respect to FIG. 2, audio management module 106 may be operative to utilize audio playback devices 206-1, 206-2, 208-1, and 208-2 in tandem to produce a collective stereo effect, in which audio effects associated with content 212** appear to originate from positions corresponding to left and right channels. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
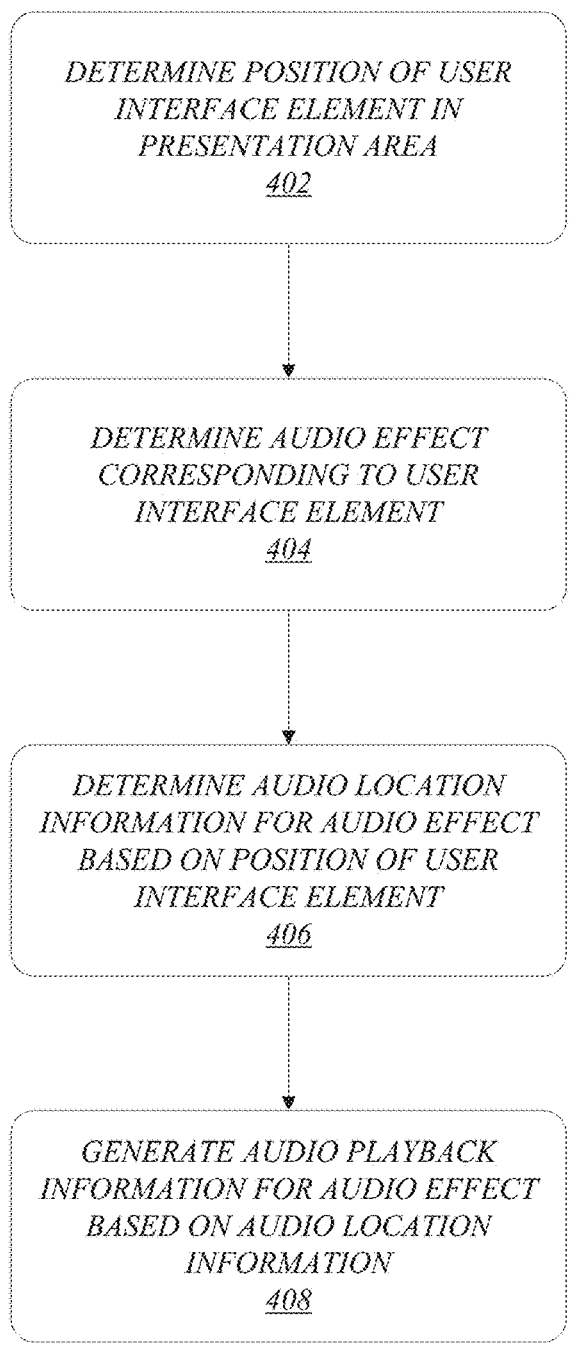
FIG. 4 illustrates one embodiment of a logic flow.

FIG. 4 illustrates one embodiment of a logic flow 400, which may be representative of the operations executed by one or more embodiments described herein. As shown in logic flow 400, a position of a user interface element in a presentation area may be determined at 402. For example, audio management module 106 of FIG. 1 may be operative to determine a position of content 212 in presentation area 200 of FIG. 2. At 404, an audio effect corresponding to the user interface element may be determined. For example, audio management module 106 of FIG. 1 may be operative to determine an audio effect corresponding to content 212 of FIG. 2. At 406, audio location information for the audio effect may be determined based on the position of the user interface element. For example, audio management module 106 of FIG. 1 may be operative to generate audio location information 116 indicating that the audio effect corresponding to content 212 of FIG. 2 should appear to originate from the right side of display 204. At 408, audio playback information for the audio effect may be generated based on the audio location information. For example, audio management module 106 of FIG. 1 may be operative to generate audio playback information 118 operative on audio playback devices 208-1 and 208-2 of FIG. 2 to cause the audio effect to be generated such that it appears to originate from the right side of display 204. The embodiments are not limited to these examples.

Figure 5:
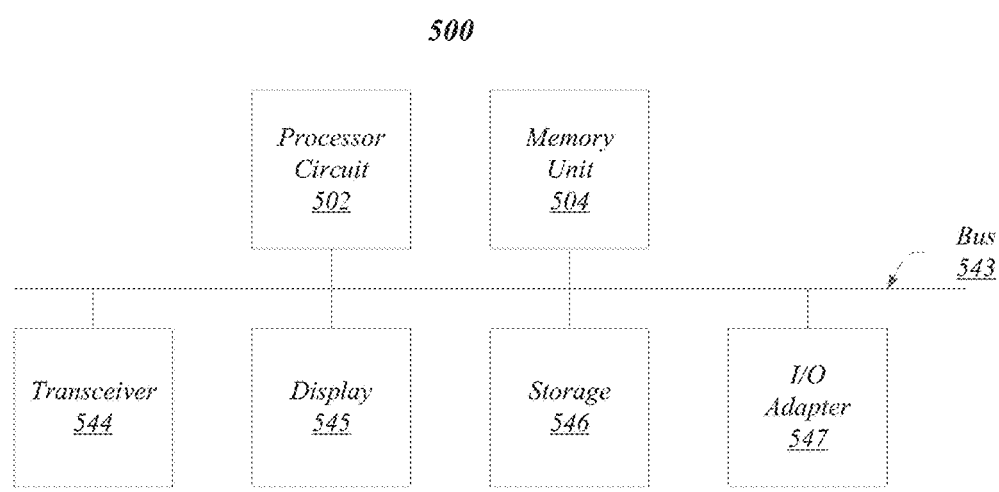
FIG. 5 illustrates one embodiment of a second system.

FIG. 5 illustrates one embodiment of a system 500. In various embodiments, system 500 may be representative of a system or architecture suitable for use with one or more embodiments described herein, such as apparatus 100 and/or system 140 of FIG. 1, presentation area 200 of FIG. 2, presentation area 300 of FIG. 3, and/or logic flow 400 of FIG. 4. The embodiments are not limited in this respect.

As shown in FIG. 5, system 500 may include multiple elements. One or more elements may be implemented using one or more circuits, components, registers, processors, software subroutines, modules, or any combination thereof, as desired for a given set of design or performance constraints. Although FIG. 5 shows a limited number of elements in a certain topology by way of example, it can be appreciated that more or less elements in any suitable topology may be used in system 500 as desired for a given implementation. The embodiments are not limited in this context.

In various embodiments, system 500 may include a processor circuit 502. Processor circuit 502 may be implemented using any processor or logic device, and may be the same as or similar to processor circuit 102 of FIG. 1.

In one embodiment, system 500 may include a memory unit 504 to couple to processor circuit 502. Memory unit 504 may be coupled to processor circuit 502 via communications bus 543, or by a dedicated communications bus between processor circuit 502 and memory unit 504, as desired for a given implementation. Memory unit 504 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 500 may include a transceiver 544. Transceiver 544 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 544 may operate in accordance with one or more applicable standards in any version. The embodiments are not limited in this context.

In various embodiments, system 500 may include a display 545. Display 545 may comprise any display device capable of displaying information received from processor circuit 502, and may be the same as or similar to a display 145-*n* of FIG. 1. The embodiments are not limited in this context.

In various embodiments, system 500 may include storage 546. Storage 546 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 546 may include technology to increase the storage performance enhanced protection for valuable digital media when multiple hard drives are included, for example. Further examples of storage 546 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 500 may include one or more I/O adapters 547. Examples of I/O adapters 547 may include Universal Serial Bus (USB) ports/adapters, IEEE 1394 Firewire ports/adapters, and so forth. The embodiments are not limited in this context.

Figure 6:
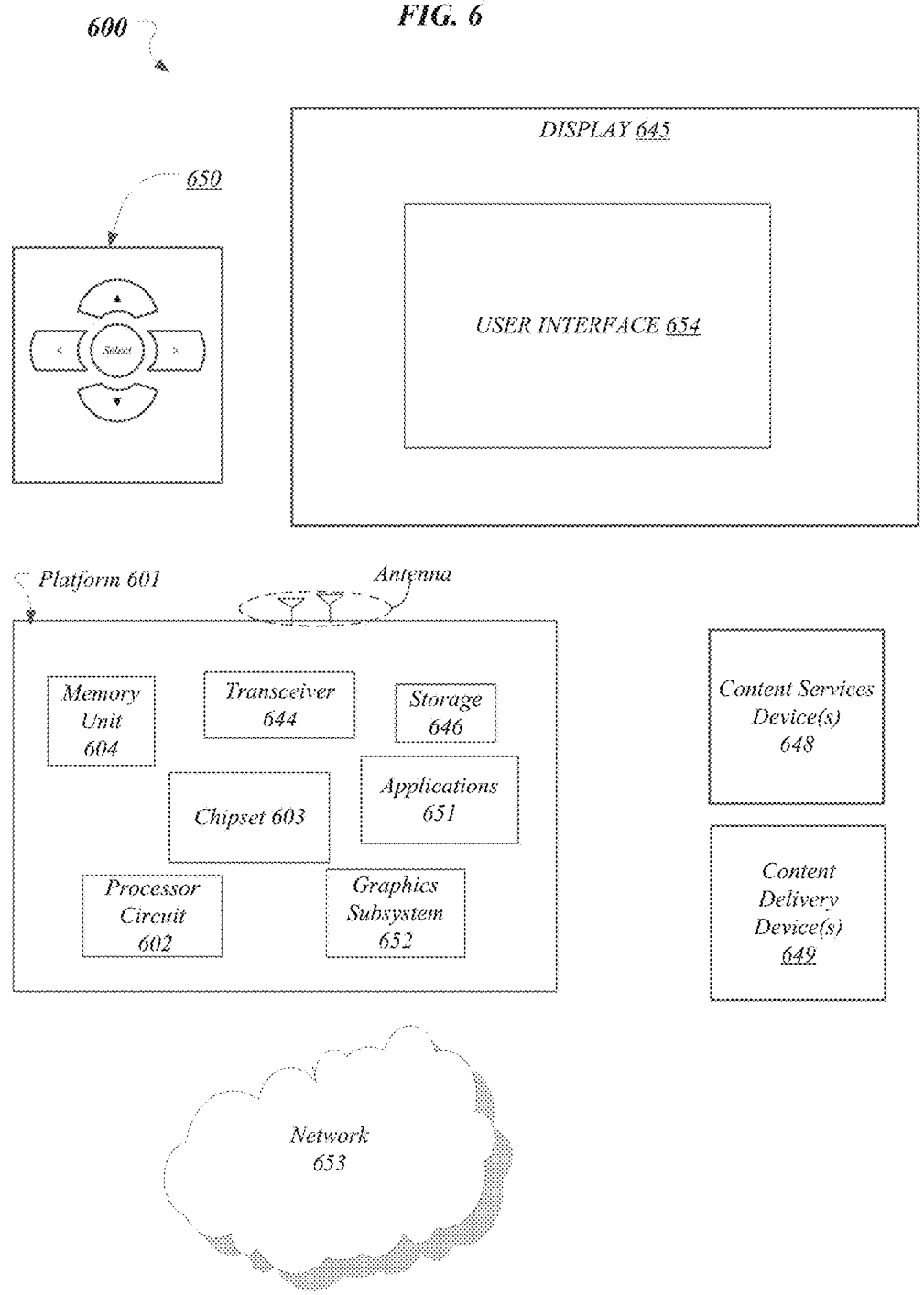
FIG. 6 illustrates one embodiment of a third system.

FIG. 6 illustrates an embodiment of a system 600. In various embodiments, system 600 may be representative of a system or architecture suitable for use with one or more embodiments described herein, such as apparatus 100 and/or system 140 of FIG. 1, presentation area 200 of FIG. 2, presentation area 300 of FIG. 3, logic flow 400 of FIG. 4, and/or system 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 includes a platform 601 coupled to a display 645. Platform 601 may receive content from a content device such as content services device(s) 648 or content delivery device(s) 649 or other similar content sources. A navigation controller 650 including one or more navigation features may be used to interact with, for example, platform 601 and/or display 645. Each of these components is described in more detail below.

In embodiments, platform 601 may include any combination of a processor circuit 602, chipset 603, memory unit 604, transceiver 644, storage 646, applications 651, and/or graphics subsystem 652. Chipset 603 may provide intercommunication among processor circuit 602, memory unit 604, transceiver 644, storage 646, applications 651, and/or graphics subsystem 652. For example, chipset 603 may include a storage adapter (not depicted) capable of providing intercommunication with storage 646.

Processor circuit 602 may be implemented using any processor or logic device, and may be the same as or similar to processor circuit 502 in FIG. 5.

Memory unit 604 may be implemented using any machine-readable or computer-readable media capable of storing data, and may be the same as or similar to memory unit 504 in FIG. 5.

Transceiver 644 may include one or more radios capable of transmitting and receiving signals using various suitable wireless communications techniques, and may be the same as or similar to transceiver 544 in FIG. 5.

Display 645 may include any television type monitor or display, and may be the same as or similar to display 545 in FIG. 5.

Storage 646 may be implemented as a non-volatile storage device, and may be the same as or similar to storage 546 in FIG. 5.

Graphics subsystem 652 may perform processing of images such as still or video for display. Graphics subsystem 652 may be a graphics processing unit (GPU) or a visual processing unit (VPU), for example. An analog or digital interface may be used to communicatively couple graphics subsystem 652 and display 645. For example, the interface may be any of a High-Definition Multimedia Interface, DisplayPort, wireless HDMI, and/or wireless HD compliant techniques. Graphics subsystem 652 could be integrated into processor circuit 602 or chipset 603. Graphics subsystem 652 could be a stand-alone card communicatively coupled to chipset 603.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 648 may be hosted by any national, international and/or independent service and thus accessible to platform 601 via the Internet, for example. Content services device(s) 648 may be coupled to platform 601 and/or to display 645. Platform 601 and/or content services device(s) 648 may be coupled to a network 653 to communicate (e.g., send and/or receive) media information to and from network 653. Content delivery device(s) 649 also may be coupled to platform 601 and/or to display 645.

In embodiments, content services device(s) 648 may include a cable television box, personal computer, network, telephone, Internet enabled devices or appliance capable of delivering digital information and/or content, and any other similar device capable of unidirectionally or bidirectionally communicating content between content providers and platform 601 and/display 645, via network 653 or directly. It will be appreciated that the content may be communicated unidirectionally and/or bidirectionally to and from any one of the components in system 600 and a content provider via network 653. Examples of content may include any media information including, for example, video, music, medical and gaming information, and so forth.

Content services device(s) 648 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 601 may receive control signals from navigation controller 650 having one or more navigation features. The navigation features of navigation controller 650 may be used to interact with a user interface 654, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 650 may be echoed on a display (e.g., display 645) by movements of a pointer, cursor, focus ring, or other visual indicators displayed on the display. For example, under the control of software applications 651, the navigation features located on navigation controller 650 may be mapped to virtual navigation features displayed on user interface 654. In embodiments, navigation controller 650 may not be a separate component but integrated into platform 601 and/or display 645. Embodiments, however, are not limited to the elements or in the context shown or described herein.

In embodiments, drivers (not shown) may include technology to enable users to instantly turn on and off platform 601 like a television with the touch of a button after initial boot-up, when enabled, for example. Program logic may allow platform 601 to stream content to media adaptors or other content services device(s) 648 or content delivery device(s) 649 when the platform is turned "off." In addition, chip set 603 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 600 may be integrated. For example, platform 601 and content services device(s) 648 may be integrated, or platform 601 and content delivery device(s) 649 may be integrated, or platform 601, content services device(s) 648, and content delivery device(s) 649 may be integrated, for example. In various embodiments, platform 601 and display 645 may be an integrated unit. Display 645 and content service device(s) 648 may be integrated, or display 645 and content delivery device(s) 649 may be integrated, for example. These examples are not meant to limit the disclosed subject matter.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 601 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
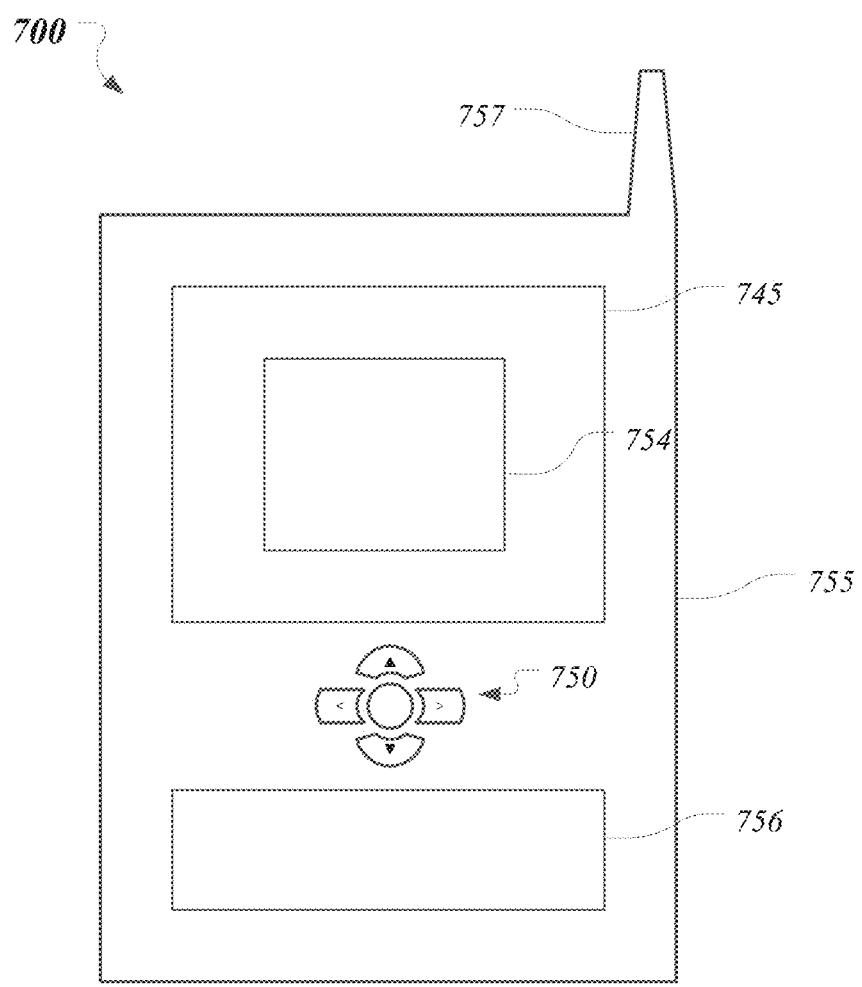
FIG. 7 illustrates one embodiment of a device.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a display 745, a navigation controller 750, a user interface 754, a housing 755, an I/O device 756, and an antenna 757. Display 745 may include any suitable display unit for displaying information appropriate for a mobile computing device, and may be the same as or similar to display 645 in FIG. 6. Navigation controller 750 may include one or more navigation features which may be used to interact with user interface 754, and may be the same as or similar to navigation controller 650 in FIG. 6. I/O device 756 may include any suitable I/O device for entering information into a mobile computing device. Examples for I/O device 756 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments.

Example 1 is at least one machine-readable medium comprising a plurality of audio processing instructions that, in response to being executed on a computing device, cause the computing device to: determine a position of a user interface element in a presentation area; determine an audio effect corresponding to the user interface element; determine audio location information for the audio effect based on the position of the user interface element, the audio location information defining an apparent position for the audio effect; and generate audio playback information for the audio effect based on the audio location information.

In Example 2, the at least one machine-readable medium of Example 1 may optionally comprise instructions that, in response to being executed on the computing device, cause the computing device to: determine presentation layout information indicating a position of one or more audio playback devices in the presentation area; and determine the audio location information based on the presentation layout information and the position of the user interface element in the presentation area.

In Example 3, the audio playback information of any one of Examples 1-2 may optionally be operative on one or more audio playback devices to generate the audio effect according to the apparent position for the audio effect.

In Example 4, the user interface element of any one of Examples 1-3 may optionally be presented in a region of a display, and the apparent position for the audio effect may optionally comprise a point in the region of the display.

In Example 5, the user interface element of any one of Examples 1-3 may optionally be extended across two displays, and the apparent position for the audio effect may optionally comprise a point between the two displays.

In Example 6, the user interface element of any one of Examples 1-3 may optionally comprise an obscured operating system window presented on a display, the apparent position for the audio effect comprising a point behind the display.

In Example 7, the at least one machine-readable medium of any one of Examples 1-6 may optionally comprise instructions that, in response to being executed on the computing device, cause the computing device to muffle the audio effect when the audio effect corresponds to an obscured user interface element.

In Example 8, the at least one machine-readable medium of any one of Examples 1-7 may optionally comprise instructions that, in response to being executed on the computing device, cause the computing device to generate audio playback information operative on two or more audio playback devices to produce the audio effect with differing volumes.

In Example 9, the at least one machine-readable medium of any one of Examples 1-8 may optionally comprise instructions that, in response to being executed on the computing device, cause the computing device to perform one or more spatial audio processing techniques to generate the audio playback information.

In Example 10, the at least one machine-readable medium of any one of Examples 1-9 may optionally comprise instructions that, in response to being executed on the computing device, cause the computing device to perform head-related transfer function (HRTF) processing to generate the audio playback information.

In Example 11, the at least one machine-readable medium of any one of Examples 1-10 may optionally comprise instructions that, in response to being executed on the computing device, cause the computing device to perform wave field synthesis to generate the audio playback information.

In Example 12, the at least one machine-readable medium of any one of Examples 1-11 may optionally comprise instructions that, in response to being executed on the computing device, cause the computing device to perform phase modification to generate the audio playback information.

In Example 13, the at least one machine-readable medium of any one of Examples 1-12 may optionally comprise instructions that, in response to being executed on the computing device, cause the computing device to perform stereo widening or reverberation processing to generate the audio playback information.

In Example 14, the user interface element of any one of Examples 1-13 may optionally comprise a user prompt, and the audio effect may optionally correspond to the user prompt.

In Example 15, the user interface element of any one of Examples 1-14 may optionally comprise a video frame, and the audio effect may optionally correspond to the video frame.

Example 16 is an audio processing apparatus comprising a processor circuit and an audio management module for execution on the processor circuit to determine a position of a user interface element in a presentation area; determine an audio effect corresponding to the user interface element; determine audio location information for the audio effect based on the position of the user interface element, the audio location information defining an apparent position for the audio effect; and generate audio playback information for the audio effect based on the audio location information.

In Example 17, the audio management module of Example 16 may optionally be for execution on the processor circuit to: determine presentation layout information indicating a position of one or more audio playback devices in the presentation area; and determine the audio location information based on the presentation layout information and the position of the user interface element in the presentation area.

In Example 18, the audio playback information of any one of Examples 16-17 may optionally be operative on one or more audio playback devices to generate the audio effect according to the apparent position for the audio effect.

In Example 19, the user interface element of any one of Examples 16-18 may optionally be presented in a region of a display, and the apparent position for the audio effect may optionally comprise a point in the region of the display.

In Example 20, the user interface element of any one of Examples 16-18 may optionally be extended across two displays, and the apparent position for the audio effect may optionally comprise a point between the two displays.

In Example 21, the user interface element of any one of Examples 16-18 may optionally comprise an obscured operating system window presented on a display, the apparent position for the audio effect comprising a point behind the display.

In Example 22, the audio management module of any one of Examples 16-21 may optionally be for execution on the processor circuit to muffle the audio effect when the audio effect corresponds to an obscured user interface element.

In Example 23, the audio management module of any one of Examples 16-22 may optionally be for execution on the processor circuit to generate audio playback information operative on two or more audio playback devices to produce the audio effect with differing volumes.

In Example 24, the audio management module of any one of Examples 16-23 may optionally be for execution on the processor circuit to perform one or more spatial audio processing techniques to generate the audio playback information.

In Example 25, the audio management module of any one of Examples 16-24 may optionally be for execution on the processor circuit to perform head-related transfer function (HRTF) processing to generate the audio playback information.

In Example 26, the audio management module of any one of Examples 16-25 may optionally be for execution on the processor circuit to perform wave field synthesis to generate the audio playback information.

In Example 27, the audio management module of any one of Examples 16-26 may optionally be for execution on the processor circuit to perform phase modification to generate the audio playback information.

In Example 28, the audio management module of any one of Examples 16-27 may optionally be for execution on the processor circuit to perform stereo widening or reverberation processing to generate the audio playback information.

In Example 29, the user interface element of any one of Examples 16-28 may optionally comprise a user prompt, and the audio effect may optionally correspond to the user prompt.

In Example 30, the user interface element of any one of Examples 16-29 may optionally comprise a video frame, and the audio effect may optionally correspond to the video frame.

Example 31 is an audio processing method, comprising: determining a position of a user interface element in a presentation area; determining an audio effect corresponding to the user interface element; determining audio location information for the audio effect based on the position of the user interface element, the audio location information defining an apparent position for the audio effect; and generating audio playback information for the audio effect based on the audio location information.

In Example 32, the method of Example 31 may optionally comprise: determining presentation layout information indicating a position of one or more audio playback devices in the presentation area; and determining the audio location information based on the presentation layout information and the position of the user interface element in the presentation area.

In Example 33, the audio playback information of any one of Examples 31-32 may optionally be operative on one or more audio playback devices to generate the audio effect according to the apparent position for the audio effect.

In Example 34, the user interface element of any one of Examples 31-33 may optionally be presented in a region of a display, and the apparent position for the audio effect may optionally comprise a point in the region of the display.

In Example 35, the user interface element of any one of Examples 31-33 may optionally be extended across two displays, and the apparent position for the audio effect may optionally comprise a point between the two displays.

In Example 36, the user interface element of any one of Examples 31-33 may optionally comprise an obscured operating system window presented on a display, the apparent position for the audio effect comprising a point behind the display.

In Example 37, the method of Examples 31-36 may optionally comprise muffling the audio effect when the audio effect corresponds to an obscured user interface element.

In Example 38, the method of any one of Examples 31-37 may optionally comprise generating audio playback information operative on two or more audio playback devices to produce the audio effect with differing volumes.

In Example 39, the method of any one of Examples 31-38 may optionally comprise performing one or more spatial audio processing techniques to generate the audio playback information.

In Example 40, the method of any one of Examples 31-39 may optionally comprise performing head-related transfer function (HRTF) processing to generate the audio playback information.

In Example 41, the method of any one of Examples 31-40 may optionally comprise performing wave field synthesis to generate the audio playback information.

In Example 42, the method of any one of Examples 31-41 may optionally comprise performing phase modification to generate the audio playback information.

In Example 43, the method of any one of Examples 31-42 may optionally comprise performing stereo widening or reverberation processing to generate the audio playback information.

In Example 44, the user interface element of any one of Examples 31-43 may optionally comprise a user prompt, and the audio effect may optionally correspond to the user prompt.

In Example 45, the user interface element of any one of Examples 31-44 may optionally comprise a video frame, and the audio effect may optionally correspond to the video frame.

Example 46 is at least one machine-readable medium comprising a plurality of instructions that, in response to being executed on a computing device, cause the computing device to perform a method according to any one of claims 31 to 45.

Example 47 is an apparatus comprising means for performing a method according to any one of claims 31 to 45.

Example 48 is a communications device arranged to perform a method according to any one of claims 31 to 45.

Example 49 is an audio processing system comprising a processor circuit, a transceiver, and an audio management module for execution on the processor circuit to determine a position of a user interface element in a presentation area; determine an audio effect corresponding to the user interface element; determine audio location information for the audio effect based on the position of the user interface element, the audio location information defining an apparent position for the audio effect; and generate audio playback information for the audio effect based on the audio location information.

In Example 50, the audio management module of Example 49 may optionally be for execution on the processor circuit to: determine presentation layout information indicating a position of one or more audio playback devices in the presentation area; and determine the audio location information based on the presentation layout information and the position of the user interface element in the presentation area.

In Example 51, the audio playback information of any one of Examples 49-50 may optionally be operative on one or more audio playback devices to generate the audio effect according to the apparent position for the audio effect.

In Example 52, the user interface element of any one of Examples 49-51 may optionally be presented in a region of a display, and the apparent position for the audio effect may optionally comprise a point in the region of the display.

In Example 53, the user interface element of any one of Examples 49-51 may optionally be extended across two displays, and the apparent position for the audio effect may optionally comprise a point between the two displays.

In Example 54, the user interface element of any one of Examples 49-51 may optionally comprise an obscured operating system window presented on a display, the apparent position for the audio effect comprising a point behind the display.

In Example 55, the audio management module of any one of Examples 49-54 may optionally be for execution on the processor circuit to muffle the audio effect when the audio effect corresponds to an obscured user interface element.

In Example 56, the audio management module of any one of Examples 49-55 may optionally be for execution on the processor circuit to generate audio playback information operative on two or more audio playback devices to produce the audio effect with differing volumes.

In Example 57, the audio management module of any one of Examples 49-56 may optionally be for execution on the processor circuit to perform one or more spatial audio processing techniques to generate the audio playback information.

In Example 58, the audio management module of any one of Examples 49-57 may optionally be for execution on the processor circuit to perform head-related transfer function (HRTF) processing to generate the audio playback information.

In Example 59, the audio management module of any one of Examples 49-58 may optionally be for execution on the processor circuit to perform wave field synthesis to generate the audio playback information.

In Example 60, the audio management module of any one of Examples 49-59 may optionally be for execution on the processor circuit to perform phase modification to generate the audio playback information.

In Example 61, the audio management module of any one of Examples 49-60 may optionally be for execution on the processor circuit to perform stereo widening or reverberation processing to generate the audio playback information.

In Example 62, the user interface element of any one of Examples 49-61 may optionally comprise a user prompt, and the audio effect may optionally correspond to the user prompt.

In Example 63, the user interface element of any one of Examples 49-62 may optionally comprise a video frame, and the audio effect may optionally correspond to the video frame.

Example 64 is an audio processing apparatus, comprising: means for determining a position of a user interface element in a presentation area; means for determining an audio effect corresponding to the user interface element; means for determining audio location information for the audio effect based on the position of the user interface element, the audio location information defining an apparent position for the audio effect; and means for generating audio playback information for the audio effect based on the audio location information.

In Example 64, the audio processing apparatus of Example 64 may optionally comprise: means for determining presentation layout information indicating a position of one or more audio playback devices in the presentation area; and means for determining the audio location information based on the presentation layout information and the position of the user interface element in the presentation area.

In Example 66, the audio playback information of any one of Examples 64-65 may optionally be operative on one or more audio playback devices to generate the audio effect according to the apparent position for the audio effect.

In Example 67, the user interface element of any one of Examples 64-66 may optionally be presented in a region of a display, and the apparent position for the audio effect may optionally comprise a point in the region of the display.

In Example 68, the user interface element of any one of Examples 64-66 may optionally be extended across two displays, and the apparent position for the audio effect may optionally comprise a point between the two displays.

In Example 69, the user interface element of any one of Examples 64-66 may optionally comprise an obscured operating system window presented on a display, the apparent position for the audio effect comprising a point behind the display.

In Example 70, the audio processing apparatus of any one of Examples 64-69 may optionally comprise means for muffling the audio effect when the audio effect corresponds to an obscured user interface element.

In Example 71, the audio processing apparatus of any one of Examples 64-70 may optionally comprise means for generating audio playback information operative on two or more audio playback devices to produce the audio effect with differing volumes.

In Example 72, the audio processing apparatus of any one of Examples 64-71 may optionally comprise means for performing one or more spatial audio processing techniques to generate the audio playback information.

In Example 73, the audio processing apparatus of any one of Examples 64-72 may optionally comprise means for performing head-related transfer function (HRTF) processing to generate the audio playback information.

In Example 74, the audio processing apparatus of any one of Examples 64-73 may optionally comprise means for performing wave field synthesis to generate the audio playback information.

In Example 75, the audio processing apparatus of any one of Examples 64-74 may optionally comprise means for performing phase modification to generate the audio playback information.

In Example 76, the audio processing apparatus of any one of Examples 64-75 may optionally comprise means for performing stereo widening or reverberation processing to generate the audio playback information.

In Example 77, the user interface element of any one of Examples 64-76 may optionally comprise a user prompt, and the audio effect may optionally correspond to the user prompt.

In Example 78, the user interface element of any one of Examples 64-77 may optionally comprise a video frame, and the audio effect may optionally correspond to the video frame.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising instructions that, in response to being executed on a processor circuit, cause the processor circuit to:
   determine presentation layout information based on positioning sensing information describing: (i) a location of at least one display in a multiple display environment, and (ii) a respective location of a plurality of audio playback devices relative to the at least one display;
   determine a position of a first user interface element within a plane of a presentation area of the at least one display;
   determine a depth of the first user interface element relative to a second user interface element also at the position;
   generate audio location information for an audio effect associated with the first user interface element based on the position of the first user interface element, the depth of the first user interface element, the locations of the plurality of audio playback devices, and the location of the at least one display, the audio location information to define an apparent position and depth for the audio effect relative to the at least one display;
   generate audio playback information for the audio effect based on the audio location information; and
   modify the generated audio playback information using one or more spatial audio processing techniques.

2. The at least one non-transitory machine-readable medium of claim 1, comprising instructions that in response to being executed by the processor circuit cause the processor circuit to:
   determine the position of the first user interface element to be within a display area of a single display of the multiple display environment; and generate the audio location information to define the apparent position for the audio effect to be within the display area of the single display.

3. The at least one non-transitory machine-readable medium of claim 1, comprising instructions that in response to being executed by the processor circuit cause the processor circuit to:
 determine presentation layout information indicating relative positions of two displays of the multiple display environment;
 determine the position of the first user interface element to be between the two displays; and
 generate the audio location information based on the presentation layout information, the depth of the first user interface element, and the position of the first user interface element between the two displays.

4. The at least one non-transitory machine-readable medium of claim 1, comprising instructions that in response to being executed by the processor circuit cause the processor circuit to:
 determine a position of at least four audio playback devices of the plurality of audio playback devices relative to the one or more displays; and
 generate the audio location information based on the at least four audio playback devices relative to the one or more displays, and the position and depth of the first user interface element.

5. The at least one non-transitory machine-readable medium of claim 4, the audio playback information operative on the one or more audio playback devices to generate the audio effect according to the apparent position and depth for the audio effect relative to the at least one display, the one or more spatial audio processing techniques comprising: (i) head-related transfer function processing, (ii) wave field synthesis, (iii) reverberation processing, (iv) stereo widening, (v) attenuation, (vi) phase modification, and (vii) phase inversion.

6. The at least one non-transitory machine-readable medium of claim 1, comprising instructions that in response to being executed by the processor circuit cause the processor circuit to:
 determine the depth of the first user interface element relative to the second user interface element to cause the first user interface element to be obscured by the second user interface element at the position; and
 generate the audio location information to define the apparent depth for the audio effect to be behind the plane of the at least one display.

7. The at least one non-transitory machine-readable medium of claim 1, comprising instructions that in response to being executed by the processor circuit cause the processor circuit to:
 determine the depth of the first user interface element relative to the second user interface element to cause the first user interface element to be obscured by the second user interface element at the position; and
 generate the audio playback information for the audio effect to muffle the audio effect.

8. An apparatus comprising:
 a processor circuit; and
 memory storing instructions which when executed by the processor circuit cause the processor circuit to:
 determine presentation layout information based on positioning sensing information describing: (i) a location of at least one display in a multiple display environment, and (ii) a respective location of a plurality of audio playback devices relative to the at least one display;
 determine a position of a first user interface element within a plane of a presentation area of the at least one display;
 determine a depth of the first user interface element relative to a second user interface element also at the position;
 generate audio location information for an audio effect associated with the first user interface element based on the position of the first user interface element, the depth of the first user interface element, the locations of the plurality of audio playback devices, and the location of the at least one display, the audio location information to define an apparent position and depth for the audio effect relative to the at least one display;
 generate audio playback information for the audio effect based on the audio location information; and
 modify the generated audio playback information based on one or more spatial audio processing techniques.

9. The apparatus of claim 8, the memory storing instructions which when executed by the processor circuit cause the processor circuit to:
 determine the position of the first user interface element to be within a display area of a single display of the multiple display environment; and
 generate the audio location information to define the apparent position for the audio effect to be within the display area of the single display.

10. The apparatus of claim 8, the memory storing instructions which when executed by the processor circuit cause the processor circuit to:
 determine presentation layout information indicating relative positions of two displays of the multiple display environment;
 determine the position of the first user interface element to be between the two displays; and
 generate the audio location information based on the presentation layout information, the depth of the first user interface element, and the position of the first user interface element between the two displays.

11. The apparatus of claim 8, the memory storing instructions which when executed by the processor circuit cause the processor circuit to:
 determine a position of at least four audio playback devices of the plurality of audio playback devices relative to the one or more displays; and
 generate the audio location information based on the at least four audio playback devices relative to the one or more displays, and the position and depth of the first user interface element.

12. The apparatus of claim 11, the audio playback information operative on the one or more audio playback devices to generate the audio effect according to the apparent position and depth for the audio effect relative to the at least one display, the one or more spatial audio processing techniques comprising: (i) head-related transfer function processing, (ii) wave field synthesis, (iii) reverberation processing, (iv) stereo widening, (v) attenuation, (vi) phase modification, and (vii) phase inversion.

13. The apparatus of claim 8, the memory storing instructions which when executed by the processor circuit cause the processor circuit to:
 determine the depth of the first user interface element relative to the second user interface element to cause the first user interface element to be obscured by the second user interface element at the position; and generate the audio location information to define the apparent depth for the audio effect to be behind the plane of the at least one display.

14. A method comprising:

determining presentation layout information based on positioning sensing information describing: (i) a location of at least one display in a multiple display environment, and (ii) a respective location of a plurality of audio playback devices relative to the at least one display;

determining a position of a first user interface element within a plane of a presentation area of the at least one display;

determining a depth of the first user interface element relative to a second user interface element also at the position;

generating audio location information for an audio effect associated with the first user interface element based on the position of the first user interface element, the depth of the first user interface element, the locations of the plurality of audio playback devices, and the location of the at least one display, the audio location information to define an apparent position and depth for the audio effect relative to the at least one display;

generating audio playback information for the audio effect based on the audio location information; and modifying the generated audio playback information based on one or more spatial audio processing techniques.

15. The method of claim 14, comprising:

determining the position of the first user interface element to be within a display area of a single display of the multiple display environment; and generating the audio location information to define the apparent position for the audio effect to be within the display area of the single display.

16. The method of claim 14, comprising:

determining presentation layout information indicating relative positions of two displays of the multiple display environment;

determining the position of the first user interface element to be between the two displays; and generating the audio location information based on the presentation layout information, the depth of the first user interface element, and the position of the first user interface element between the two displays.

17. The method of claim 14, comprising:

determining a position of at least four audio playback devices of the plurality of audio playback devices relative to the one or more displays; and generating the audio location information based on the at least four audio playback devices relative to the one or more displays, and the position and depth of the first user interface element.

18. The method of claim 17, the audio playback information operative on the one or more audio playback devices to generate the audio effect according to the apparent position and depth for the audio effect relative to the at least one display, the one or more spatial audio processing techniques comprising: (i) head-related transfer function processing, (ii) wave field synthesis, (iii) reverberation processing, (iv) stereo widening, (v) attenuation, (vi) phase modification, and (vii) phase inversion.

19. The method of claim 14, comprising:

determining the depth of the first user interface element relative to the second user interface element to cause the first user interface element to be obscured by the second user interface element at the position; and generating the audio playback information for the audio effect to muffle the audio effect.

20. A system, comprising:

a processor circuit;

at least one display; and a memory storing instructions which when executed by the processor circuit cause the processor circuit to:

determine presentation layout information based on positioning sensing information describing: (i) a location of at least one display in a multiple display environment, and (ii) a respective location of a plurality of audio playback devices relative to the at least one display;

determine a position of a first user interface element within a plane of a presentation area of the at least one display;

determine a depth of the first user interface element relative to a second user interface element also at the position;

generate audio location information for an audio effect associated with the first user interface element based on the position of the first user interface element, the depth of the first user interface element, the locations of the plurality of audio playback devices, and the location of the at least one display, the audio location information to define an apparent position and depth for the audio effect relative to the at least one display;

generate audio playback information for the audio effect based on the audio location information; and modify the generated audio playback information based on one or more spatial audio processing techniques.

21. The system of claim 20, the memory storing instructions which when executed by the processor circuit cause the processor circuit to:

determine the position of the first user interface element to be within a display area of a single display of the multiple display environment; and generate the audio location information to define the apparent position for the audio effect to be within the display area of the single display.

22. The system of claim 20, the memory storing instructions which when executed by the processor circuit cause the processor circuit to:

determine presentation layout information indicating relative positions of two displays of the multiple display environment;

determine the position of the first user interface element to be between the two displays; and generate the audio location information based on the presentation layout information, the depth of the first user interface element, and the position of the first user interface element between the two displays.

23. The system of claim 20, the memory storing instructions which when executed by the processor circuit cause the processor circuit to:

determine a position of at least four audio playback devices of the plurality of audio playback devices relative to the one or more displays; and generate the audio location information based on the at least four audio playback devices relative to the one or more displays, and the position and depth of the first user interface element.

24. The system of claim 23, the audio playback information operative on the one or more audio playback devices to generate the audio effect according to the apparent position and depth for the audio effect relative to the at least one display, the one or more spatial audio processing techniques comprising: (i) head-related transfer function processing, (ii) wave field synthesis, (iii) reverberation processing, (iv) stereo widening, (v) attenuation, (vi) phase modification, and (vii) phase inversion.

25. The system of claim 20, the memory storing instructions which when executed by the processor circuit cause the processor circuit to:
    determine the depth of the first user interface element relative to the second user interface element to cause the first user interface element to be obscured by the second user interface element at the position; and
    generate the audio location information to define the apparent depth for the audio effect to be behind the plane of the at least one display.

* * * * *